United States Patent
Blanchard et al.

(10) Patent No.: US 9,040,821 B2
(45) Date of Patent: May 26, 2015

(54) AIRCRAFT CABLE ROUTING HARNESS

(75) Inventors: Jack Blanchard, Bristol (GB); Anthony Bryant, Wotton-Under-Edge (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 13/284,135

(22) Filed: Oct. 28, 2011

(65) Prior Publication Data

US 2012/0103685 A1 May 3, 2012

(30) Foreign Application Priority Data

Oct. 29, 2010 (GB) .................................. 1018248.3
Oct. 29, 2010 (GB) .................................. 1018250.9

(51) Int. Cl.
*H02G 3/02* (2006.01)
*B64C 3/18* (2006.01)
*H02G 3/04* (2006.01)

(52) U.S. Cl.
CPC ................ *B64C 3/18* (2013.01); *H02G 3/0431* (2013.01)

(58) Field of Classification Search
USPC ................... 174/115, 117 F, 72 A, 50; 244/2; 439/535; 220/4.02
See application file for complete search history.

(56) References Cited

U.S. PATENT DOCUMENTS

| | | | |
|---|---|---|---|
| 3,011,009 A | | 11/1961 | Titus |
| 3,128,214 A | * | 4/1964 | Lay ................................ 264/258 |
| 3,903,354 A | * | 9/1975 | Dageforde .................... 174/107 |
| 4,751,614 A | * | 6/1988 | Mehnert ....................... 361/437 |
| 5,045,635 A | * | 9/1991 | Kaplo et al. .................. 174/354 |
| 5,132,278 A | * | 7/1992 | Stevens et al. ................ 505/231 |
| 6,446,905 B1 | * | 9/2002 | Campbell et al. ................. 244/2 |
| 2007/0129902 A1 | * | 6/2007 | Orbell ............................ 702/55 |
| 2008/0185478 A1 | | 8/2008 | Dannenberg |
| 2010/0078847 A1 | | 4/2010 | Lind et al. |
| 2010/0258686 A1 | | 10/2010 | Sutton et al. |
| 2010/0308169 A1 | | 12/2010 | Blanchard et al. |

FOREIGN PATENT DOCUMENTS

FR 2467778 A1 4/1981
JP 63-285808 A 11/1988

OTHER PUBLICATIONS

British Search Report for 1018248.3 dated Feb. 14, 2011.
British Search Report for 1018250.9 dated Feb. 18, 2011.

* cited by examiner

*Primary Examiner* — Dhirubhai R Patel
(74) *Attorney, Agent, or Firm* — Lowe Hauptman & Ham, LLP

(57) ABSTRACT

A harness is provided comprising a body having a series of electrical conductors embedded therein and substantially running along the length thereof. The body may be part of a structural component such as stringer.

19 Claims, 4 Drawing Sheets

AIRCRAFT CABLE ROUTING HARNESS

RELATED APPLICATIONS

The present application is based on, and claims priority from, British Application Number 1018248.3, filed Oct. 29, 2010, and British Application Number 1018250.9, filed Oct. 29, 2010, the disclosure of which is hereby incorporated by reference herein in its entirety.

FIELD OF THE INVENTION

The present invention relates to an aircraft cable routing harness. More specifically, the present invention relates to a cable routing harness having a conductor embedded therein, wherein the harness is a substantially inflexible structural member and may be used in a fuel quantity installation of an aircraft.

BACKGROUND OF THE INVENTION

Traditionally, cables are routed throughout aircraft and in particularly through aircraft wings using cable raceways. These raceways are generally constructed from aluminium and comprise channel sections into which cables can be secured. Such cables are often braided to provide electromagnetic protection. The raceway serves to guide and secure the cables and protect them from external mechanical damage. The cables are often secured in place in the raceway channels using clips.

Fuel quantity installation (FQI) cable harnesses are routed through aircraft fuel tanks, in particular through the tanks in aircraft wings. These harnesses are clipped to the aircraft structure to hold them in place. Such harnesses are often braided or routed in a multi-layered conduit to provide electro-magnetic protection. Such structures also provide multiple layer protection to ensure that the wires are not exposed, even if the outer layers are damaged.

A problem with known raceways is that they add significant weight to the aircraft. Furthermore, the cables are relatively free to move within the raceways which may affect their proximity (i.e. potentially causing problems with electromagnetic interference) and may cause friction between adjacent cables. This is undesirable. Further, known harnesses are relatively flexible and therefore must be clipped quite frequently along their length. This adds weight to the aircraft and makes the assembly process lengthy and costly.

A further technical challenge in this field is to manage interference from adjacent conductors, and to prevent build up of static charge which could otherwise cause arcing.

It is an aim of the invention to overcome or at least mitigate one or more of the above problems.

SUMMARY OF THE INVENTION

According to a first aspect of the invention there is provided an aircraft cable routing harness comprising: an elongate body having an embedded conductor extending along its length, and, a plurality of conductive connectors extending from the body for connection to an aircraft voltage reference to dissipate excess unwanted charge from a component of the harness.

By "harness" we mean a structure capable of retaining a conductor in a fixed location relative thereto.

By providing a harness having an embedded conductor, the use of complex clips and channel section raceways is thereby avoided. Furthermore, the fact that the conductors are embedded within the harness means that their proximity can be maintained.

Preferably the body is substantially inflexible, therefore fewer mounting points are required. The harness may be a structural load bearing component of an aircraft, for example a wing spar or stringer.

Preferably the embedded conductor is electromagnetically shielded, for example by a conducting sheath constructed from a metal foil. The conducting sheath may therefore be in electrical contact with the plurality of conductive connectors.

Alternatively, or in addition, the plurality of conductive connectors may be used for conducting static charge from the body to the fuel tank wall. The harness may have a first group of conductive connectors for wire shield binding, and a second group for static bonding. Preferably the second group are positioned intermittently along the length of the body, whilst the first group are at the ends of each body section.

The plurality of conductive connectors may be clips configured to at least partially surround the body. The clips may be constructed from a carbon doped composite, and are therefore conductive.

Preferably the clips are configured to hold the harness away from an aircraft fuel tank interior wall. The connectors may define a snap fit formation to receive the body.

Preferably the body is at least partially constructed from a laminar composite, and the embedded conductor is embedded within the matrix material of the composite and positioned between adjacent layers of the laminate. The embedded conductor may be a wire or a printed circuit board.

Preferably the body is at least partially constructed from a laminar composite and the printed circuit board comprises a planer substrate oriented substantially parallel with the composite laminate.

The harness may define one (or more) raceway channel configured to receive a cable.

The invention also provides an aircraft wing comprising a structural load bearing component having a substantially inflexible, elongate, composite body, which body has an embedded conductor extending along its length.

The invention also provides an aircraft fuel tank comprising:
 a tank wall,
 a fuel quantity installation cable routing harness having an elongate body having a conductor embedded therein and extending along its length,
 wherein the elongate body is positioned in direct contact with the tank wall.

Preferably the body is constructed from a glass-reinforced polymer.

BRIEF DESCRIPTION OF THE DRAWINGS

An example aircraft cable routing harness in accordance with the invention will now be described with reference to the accompanying figures in which.

DETAILED DESCRIPTION OF THE PREFERRED EMBODIMENTS

Figure 1:
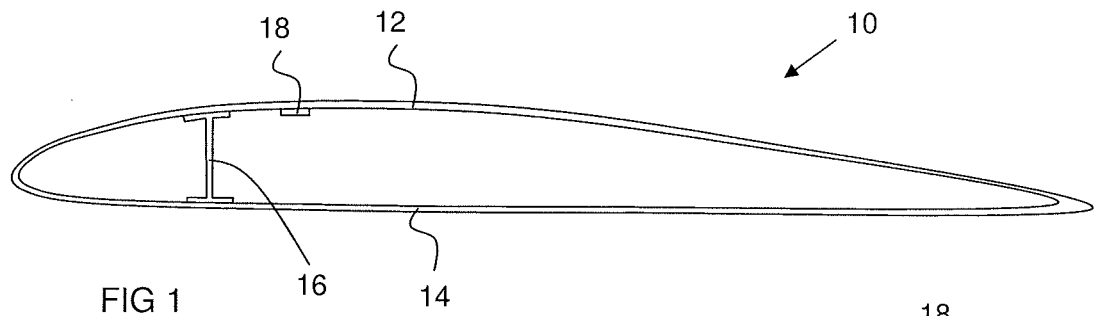
FIG. 1 is a cross-section view of an aircraft wing.

Referring to FIG. 1, a side cross-section of an aircraft wing 10 is shown having an upper skin 12 and a lower skin 14, a spar 16 and a harness 18. The spar 16 provides structural reinforcement for the wing across its span.

Figure 2:
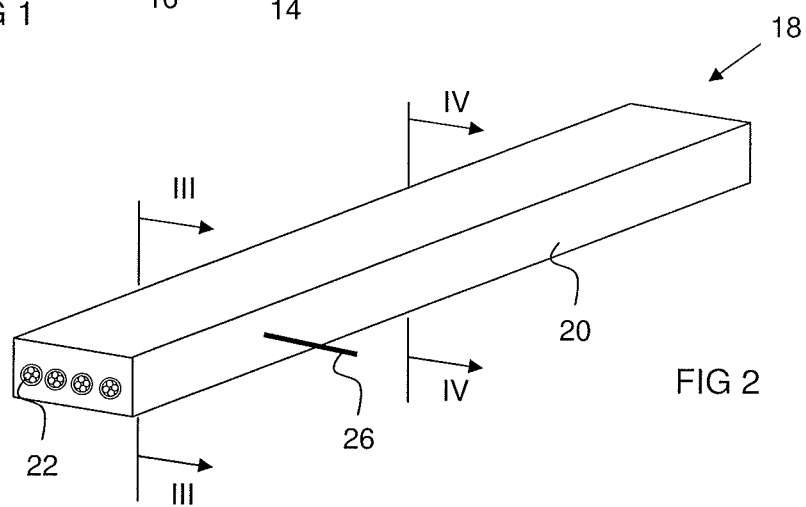
FIG. 2 is a perspective view of a harness in accordance with the present invention.

Referring to FIG. 2, the harness 18 is shown in detail. The harness 18 comprises a body 20 being substantially rectangular in cross-section and being constructed from a glass fibre reinforced polymer (GFRP) material. The body 20 defines four cable groups 22 embedded therein and running substantially along the length of the body 20.

Figure 3:
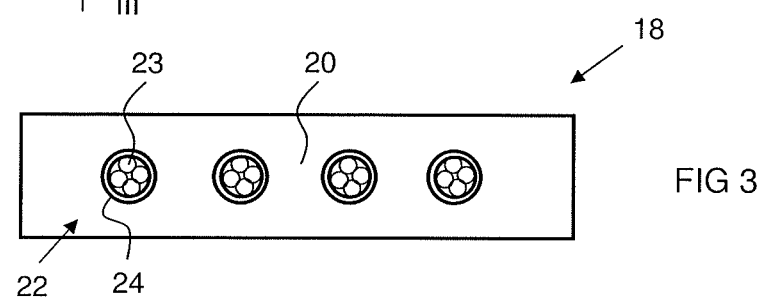
FIG. 3 is a cross-section view of the harness of FIG. 2 taken at III-III.
Figure 4:
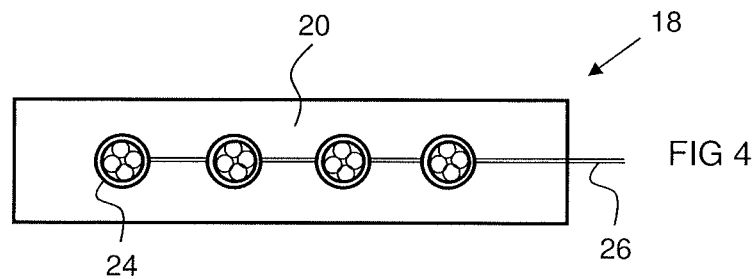
FIG. 4 is a cross-section view of the harness of FIG. 2 taken along IV-IV.

Referring to FIG. 3, each cable group 22 comprises a plurality of cables 23 in a bundle surrounded by a conductive foil sheath 24. The foil sheath 24 surrounds the bundle of cables 23 and acts as an electro-magnetic shield. Referring to FIG. 4, at positions along the length of the harness 18 (preferably at the ends of the harness) the sheaths 24 break out of the body 20 and are bonded to an earth terminal 26 which is connected to the aircraft's earth. As such, each of the cables 23 are electro-magnetically protected from the effects of the neighbouring cable group and from any external electro-magnetic radiation.

Figure 5:
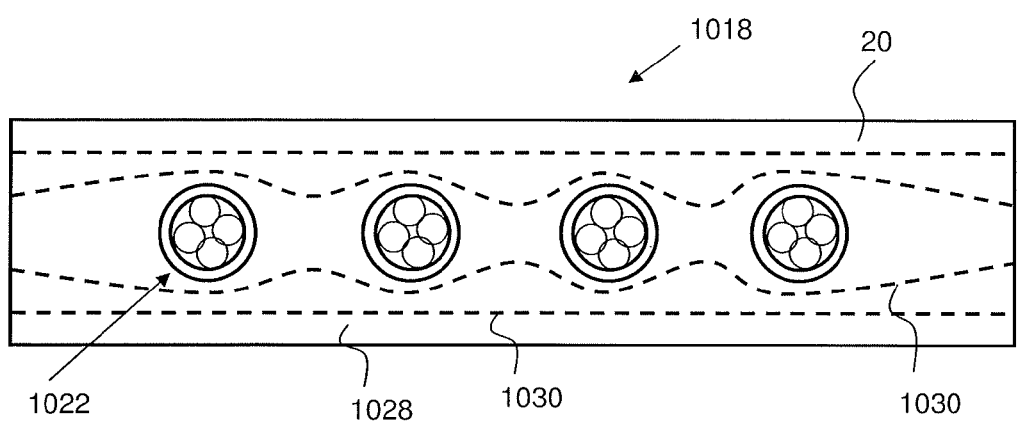
FIG. 5 is a close-up view of the cross-section of FIG. 3.

Turning to FIG. 5, the an alternative harness 1018 is shown having a body 1020 constructed from a carbon fibre reinforced polymer (CFRP) material comprising a plastic matrix 1028 embedded in which are carbon fibre sheets 1030 spanning the width of the harness 1018. Each of the cable groups 1022 lies between two of the carbon fibre sheets 1030 and, as such, forms part of the layer of the composite material.

Figure 6:
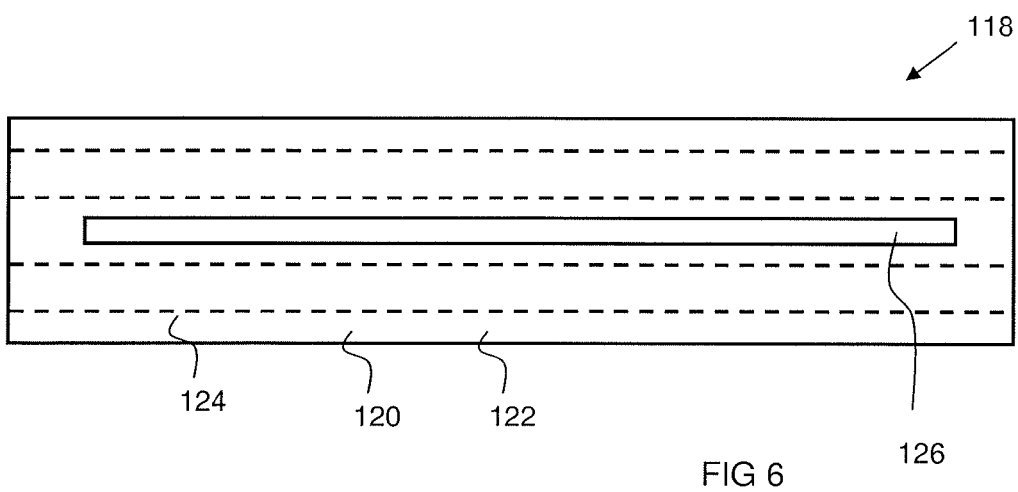
FIG. 6 is a cross-section view of an alternative harness in accordance with the present invention.

Turning to FIG. 6, an alternative harness 118 is shown having a CFRP composite body 120 comprising a matrix material 122 in which several carbon fibre layers 124 are embedded. A printed circuit board (PCB 126) is embedded within the body 120 and lies between two adjacent layers of carbon fibre material 124.

The PCB 126 defines several conductor paths which run along the length of the stringer 18 to provide substantially the same functionality as the cables 23.

It is conceivable that the harness 18 may comprise several individual harness components or modules which are joined at their ends. Mechanical connectors may be provided to give mechanical stability between each of the sub-components and, in particular, electrical connectors would also be provided to maintain connections between the cable ends 22. Connectors may also be provided at the ends to bond the wire shields (i.e. sheaths 24) to the aircraft voltage reference.

Figure 7:
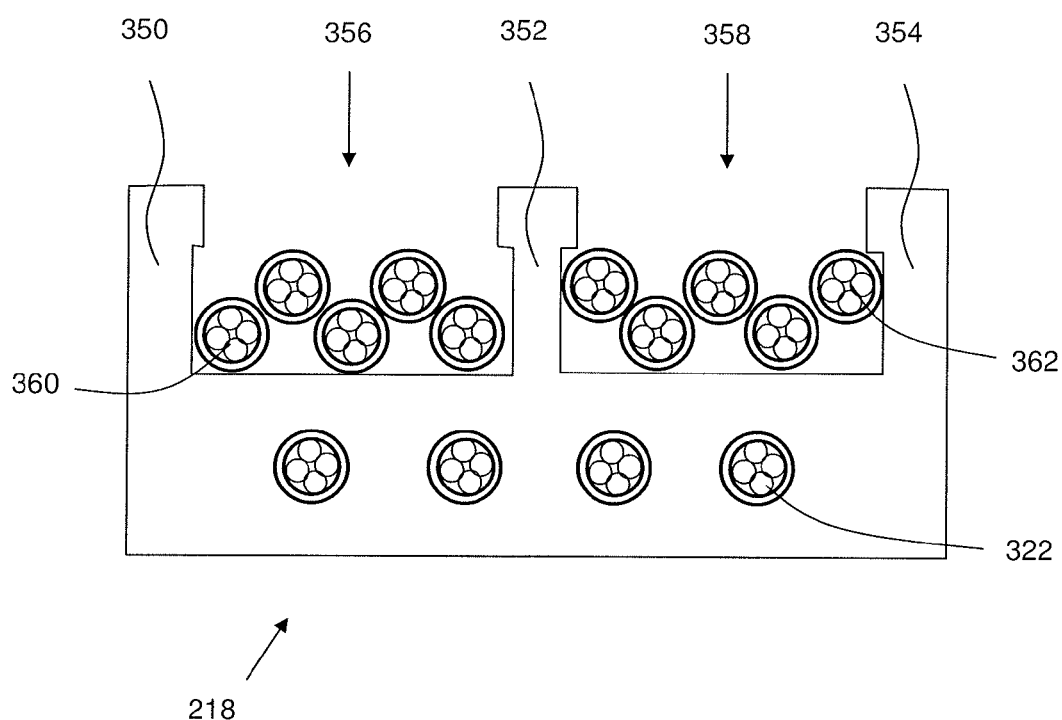
FIG. 7 is a cross-section view of an further alternative harness in accordance with the present invention; and, FIG. 8 is a close up of a part of an aircraft wing.

Referring to FIG. 7, a cable harness 218 which may be structural in nature (e.g. on the inside of an aircraft fuselage) is similar to the harnesses 18, 1018, 1189 with the exception that three upstanding walls 350, 352, 354 form a pair of cable raceway channels 356, 358. Cable bundles 360, 362 are installed in the raceway channels 356, 358.

A plurality of cable groups 322 are embedded within the harness 218, and are electromagnetically shielded such that interference from the bundles 360, 362 is minimized.

Figure 8:
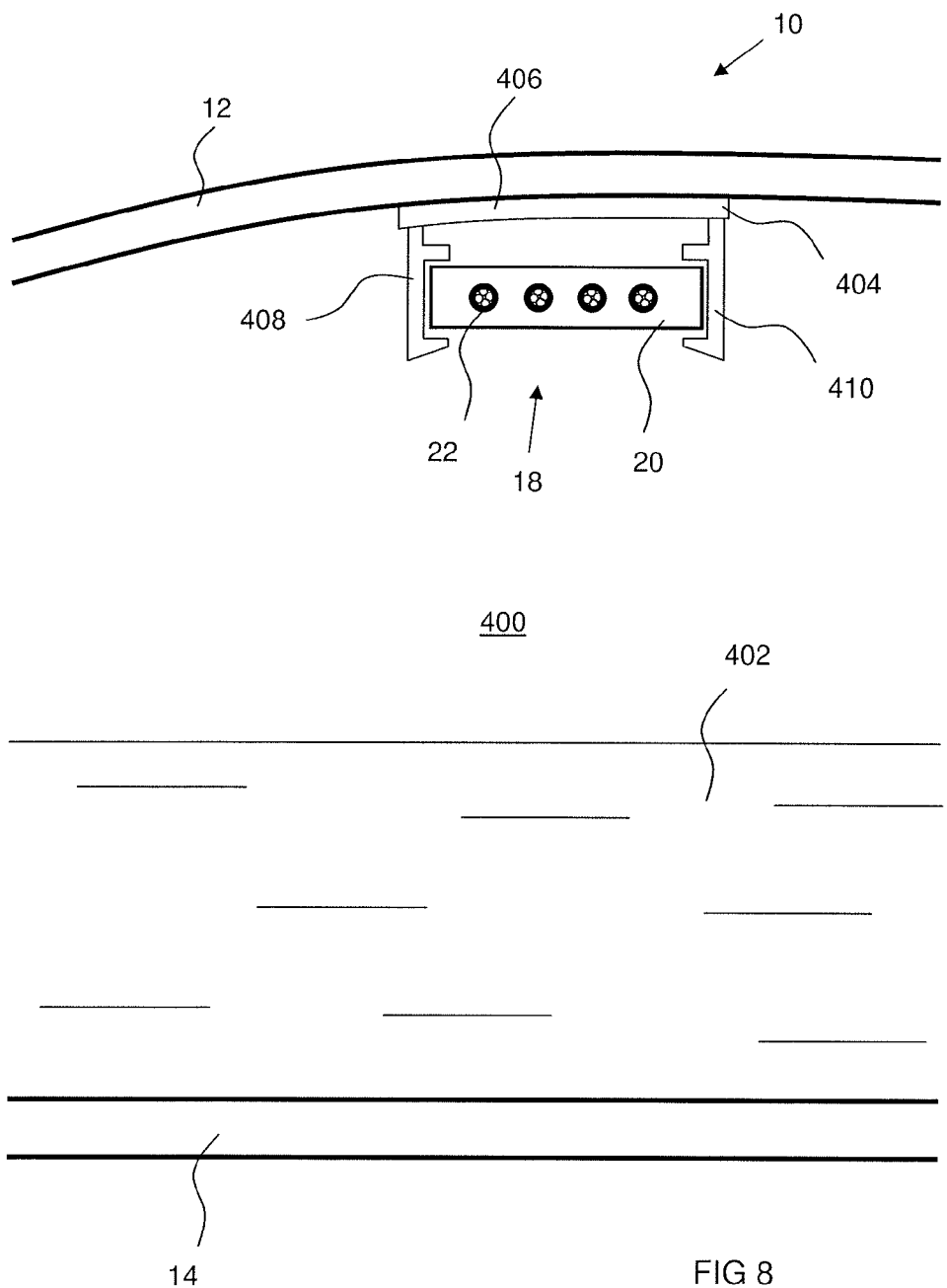

Referring to FIG. 8, the aircraft wing 10 is shown in detail. The upper skin 12 and the lower skin 14 each define the boundary of a fuel tank 400 containing fuel 402. A connector in the form of a clipping arrangement 404 is provided at the roof of the tank and comprises a base 406, a first resilient arm 408 and a second opposite resilient arm 410 extending therefrom into the tank 400. The harness 18 is suspended from the upper skin 12 (or any other appropriate structure at the roof of the tank).

It will be noted that the body 20 is constructed from the non-conductive GFRP to prevent any conduction between the conductors/sheaths and the exterior surface of the body 20.

Being non-conductive, it is important to avoid the build-up of static charge on the surface of the body 20.

As such, the body 20 is clipped between the two clips 408, 410 such that it is spaced apart from the skin 12 (in order to prevent any arcing should static occur). The clips 408, 410 are constructed from a conductive material such as carbon doped GFRP or CFRP in order to conduct any static which builds up on the body 20 to the tank wall 12 (i.e. to earth).

Because the body 20 is stiff (being constructed form GFRP) the location of the clips 408, 410 is determined by the requirement to conduct static away from the body 20. Therefore the clips 408, 410 can be spaced further apart than required for a flexible harness.

It is envisaged that the structural clips 408, 410 may be interspersed with simple conductive connectors passing between the body 20 and the skin 12 to specifically conduct static, without structurally supporting the body 20. This saves weight.

It will be noted that instead of providing an air gap, the harness 18 can be made significantly thicker on its top side so as to extend to the skin 12 thus providing the necessary protection from static. If the body 20 is constructed from a material which is less prone to arcing than the air/fuel vapour mixture within the tank (e.g. GFRP) then the cable groups 22 are positioned closer to the wing skin 12.

Variations fall within the scope of the present invention.

The harness may be structural—e.g. a stringer running in a spanwise direction which as well as acting as a harness provides some structural rigidity to the aircraft wing. Known structural components may be replaced by structural harnesses according to the present invention.

Alternatively, the body may form part of the structure within the aircraft fuselage or any other part of the aircraft body. It is envisaged that the body 20, 120 could take the shape and form of any given structural or non-structural component within the aircraft body thus conforming to the packaging requirements of the cable harness.

The harness body may be constructed from any suitable material depending on the structural and conductive properties required. In the event that it is positioned in the fuel tank, a non conductive outer surface is desirable (e.g. the matrix of a CFRP or GFRP) which is intermittently bonded to the aircraft structure.

What is claimed is:

1. An aircraft fuel tank assembly, comprising:
    an aircraft wing having an upper skin and a lower skin defining a fuel tank; and,
    a fuel quantity installation cable routing harness within the fuel tank, the fuel quantity installation cable routing harness comprising: an elongate body having an embedded conductor extending along its length; and,
    at least one connector extending from a base attached to one of upper or lower skins to the elongate body to provide an air gap between the elongate body and the base.

2. An aircraft fuel tank assembly according to claim 1 in which the elongate body is substantially inflexible.

3. An aircraft fuel tank assembly according to claim 1, in which the embedded conductor is electromagnetically shielded.

4. An aircraft fuel tank assembly according to claim 3, in which the embedded conductor is surrounded by a conducting sheath.

5. An aircraft fuel tank assembly according to claim 4, in which the sheath is constructed from a metal foil.

6. An aircraft fuel tank assembly according to claim 5, in which the conducting sheath is in electrical contact with the at least one connector.

7. An aircraft fuel tank assembly according to claim 1 in which the at least one connector is conductive for conducting static charge from the elongate body to a fuel tank wall.

8. An aircraft fuel tank assembly according to claim 7 in which the at least one connector is a clip configured to at least partially surround the elongate body.

9. An aircraft fuel tank assembly according to claim 8 in which the clip is constructed from a carbon doped composite.

10. An aircraft fuel tank assembly according to claim 8 in which the at least one connector defines a snap fit formation to receive the elongate body.

11. An aircraft fuel tank assembly according to claim 1, in which the elongate body is at least partially constructed from a laminar composite, and the embedded conductor is embedded within a matrix material of the composite and positioned between adjacent layers of the laminate.

12. An aircraft fuel tank assembly according to claim 1, in which the embedded conductor is a wire.

13. An aircraft fuel tank assembly according to claim 1, further comprising a printed circuit board embedded within the body.

14. An aircraft fuel tank assembly according to claim 13, in which the elongate body is at least partially constructed from a laminar composite and the printed circuit board comprises a planer substrate oriented substantially parallel with the composite laminate.

15. An aircraft fuel tank assembly according to claim 1, defining at least one raceway channel configured to receive a cable.

16. An aircraft fuel tank assembly according to claim 15, defining a plurality of raceway channels.

17. An aircraft fuel tank assembly, comprising:
an aircraft wing having a wing skin defining a fuel tank; and,
a fuel quantity installation cable routing harness within the fuel tank, the fuel quantity installation cable routing harness comprising: an elongate body having an embedded conductor extending along its length;
at least one resilient arm extending from a base attached to the wing skin to the elongate body to provide an air gap between the elongate body and the base.

18. An aircraft fuel tank assembly according to claim 17, wherein the at least one resilient arm is a pair of resilient arms holding said elongate body therebetween.

19. An aircraft fuel tank assembly, comprising:
an aircraft wing having a wing skin defining a fuel tank; and,
a fuel quantity installation cable routing harness within the fuel tank, the fuel quantity installation cable routing harness comprising: an elongate body having an embedded conductor extending along its length;
a base attached to a lower surface of said wing skin, and a pair of resilient arms extending from said base to the elongate body to provide an air gap between the elongate body and the base.

* * * * *